Jan. 4, 1972   J. E. COTTON   3,632,730
METHOD OF MAKING A FLUME
Filed April 7, 1969   2 Sheets-Sheet 1

INVENTOR
JAMES E. COTTON
BY
ATTORNEYS

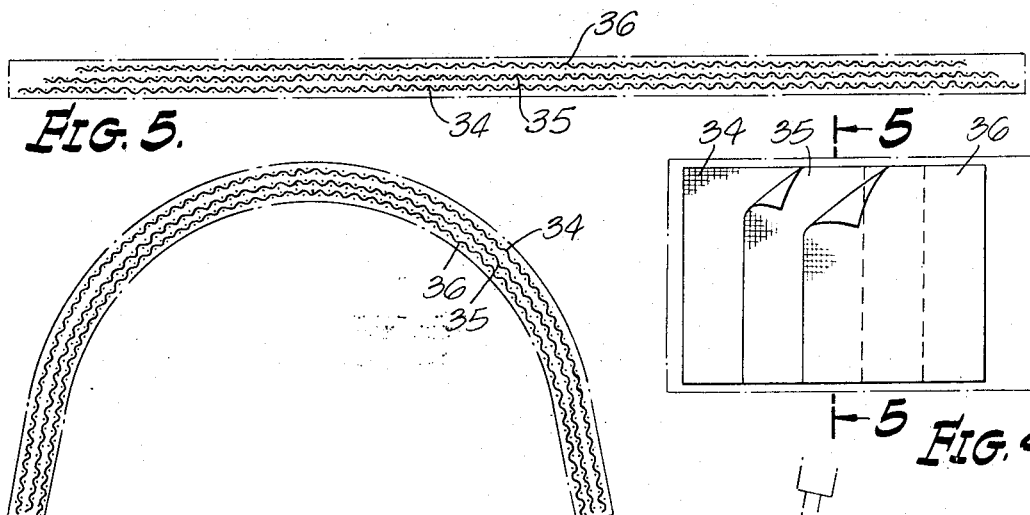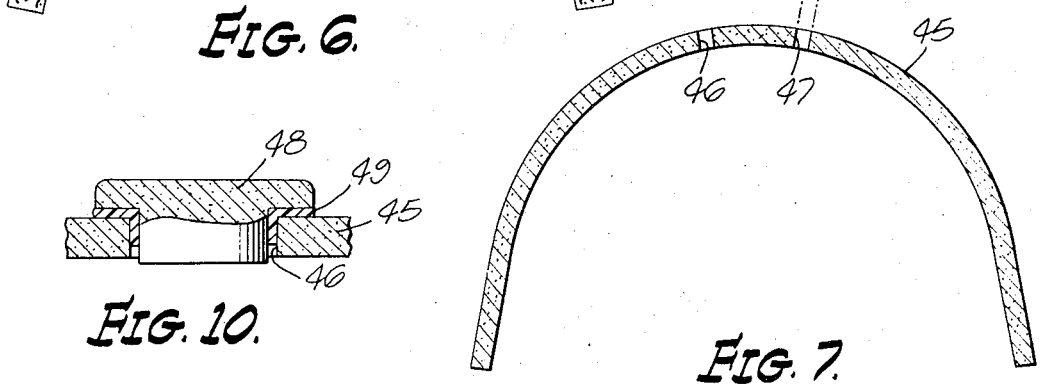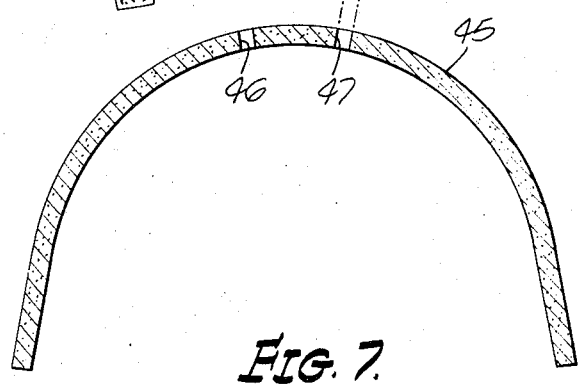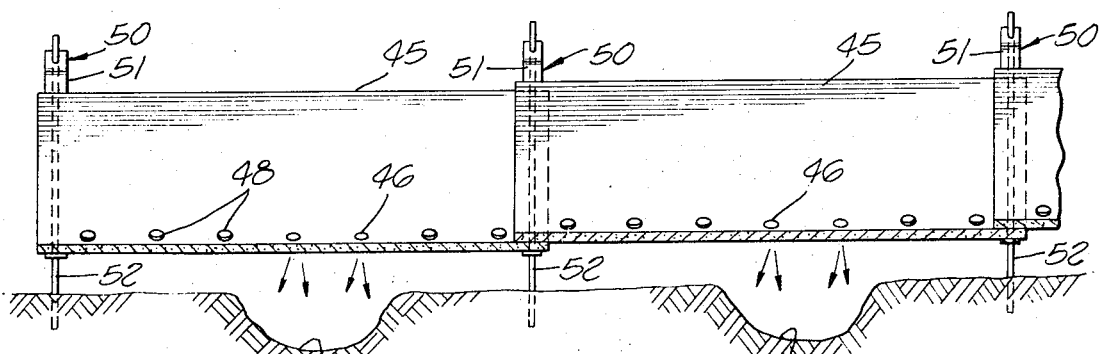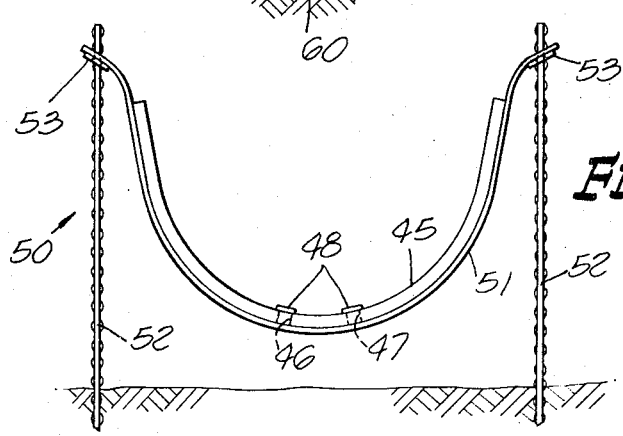

United States Patent Office 3,632,730
Patented Jan. 4, 1972

3,632,730
METHOD OF MAKING A FLUME
James E. Cotton, Honolulu, Hawaii, assignor of a fractional part interest to Richard J. Dimit, Los Angeles, Calif.
Filed Apr. 7, 1969, Ser. No. 813,882
Int. Cl. B29d 9/00
U.S. Cl. 264—295           10 Claims

ABSTRACT OF THE DISCLOSURE

Method of making a water flume of lightweight, thin, flexible ferro cement comprising a plurality of flumes molded to shape from superimposed layers of fresh cement reinforced with flexible mesh and employing one layer as the mold form for the adjacent layer. By this technique, the flumes are molded in internested sets of complementally shaped, semi-tubular structures. One or more rows of closely spaced, normally closed outlets are provided along the flume bottom and these outlets can be unplugged separately or in groups to regulate the location and amount of flow released from the flume. The flume sections are formed flat, one on top of the other, using flexible film separators following which the layered mass is folded against the opposite side of a rigid, semi-tubular form and held until the cement sets. The outlet holes are formed through the internested mass and the finished product is carried to the field, inverted, and assembled end to end in overlapping relation.

---

This invention relates to flumes and their construction and more particularly to an improved method of making a lightweight molded ferro cement flume and flume assembly, as well as to the method of fabricating and using the same.

Various techniques have been employed over the years in conducting water from one place to another including its controlled and regulated distribution over the ground for irrigation purposes. Frequently, economics have been a controlling factor and resort has been had to inexpensive and makeshift expedients. At times, however, more sophisticated attempts have been made to evolve well-engineered concepts in the interest of longer life, greater efficiency, lower upkeep, and increased versatility. Cast concrete flumes of a wide variety of designs and materials as well as of metal, wood, and other structural materials have been proposed heretofore but these are subject to serious disadvantages and shortcomings avoided by the present invention.

For example, by this invention there is provided a substantially improved, lightweight, flexible-walled, molded ferro cement flume adapted to be fabricated in mass quantities economically and much more rapidly than any design proposed heretofore. The flume is characterized by its unusually thin flexible walls. The semi-tubular flume sections are molded, in major part, by contact with adjacent flumes thereby assuring accurate, complementally-shaped adjacent flume sections thereby reducing the problem of providing fluid-tight joints. More explicitly, thinwalled plaques of reinforced ferro cement are formed one on top of another to a desired height while supported in flat horizontal positions. The plaques are separated from one another by a thin, nonadhering separator film and the opposite lateral portions are simultaneously deformed into an arc against a supporting rigid form and held compressed so deformed while taking a set. Desirably but not necessarily, the flumes are bored to form one or more rows of holes along their central bottom areas after which the stack of flumes is transported to a place of installation before being separated. The flumes are then lifted away individually, inverted if necessary, and arranged end-to-end in suspension cradles with their adjacent ends overlapping and sealed by a suitable intervening layer of mastic or the like. Although the flumes of a particular set molded at the same time differ slightly in cross-sectional configuration, the ends of adjacent flumes are assured of being complementally shaped owing to the fact that one thereof served as a shaping mold for the adjacent flume.

A feature of particular importance is the unusual thinness of the flume walls, thereby not only greatly reducing the required construction material and weight but, of even greater importance, imparting unusual flexibility to the finished product. This later capability enables the flumes to absorb shock, sharp blows, and rough handling without risk of cracking and crazing and enables the flumes to accommodate themselves to ground settling and slight movement of the terrain commonplace to some degree in all areas and particularly in areas subject to earth tremors and quakes.

Desirably, the invention flume system is supported in cradles positioned beneath their overlapped ends with the bottoms largely or entirely out of contact with the intervening ground. The rate of discharge is easily controlled and regulated depending upon the number of closely spaced, small diameter outlets unplugged at any particular location along the length of the flume. Desirably, separate rows of openings are employed along the opposite sides of the flume thereby permitting the independent control of water distribution to the opposite sides of a flume located along a ridge or, alternatively, increasing the number of available outlets at a selected point along the length of the flume.

Accordingly, it is a primary object of the present invention to provide a method of making an improved, lightweight, highstrength, highly flexible, molded concrete flume and a method of assembling the same.

Another object of the invention is the provision of a set of molded flumes precisely complemental in shape owing to being molded under pressure while in direct contact with one another.

Another object of the invention is the provision of a set of internested, molded, ferro cement flexible flumes molded against one another and separated by thin flexible film.

Another object of the invention is the provision of a water-distributing flumeway formed by thin flexible molded ferro cement flume sections assembled in overlapping relation and suspended at its joints by metal straps supported at their ends from driven stakes or the like.

Another object of the invention is the provision of a flumeway having one or more rows of closely spaced outlets normally closed by removable plugs adapted to be removed where and in the number required to provide a desired rate of discharge.

Another object of the invention is the provision of an improved, low cost method of molding flumes by preparing superimposed slabs of mesh-reinforced cement supported directly on one another in a horizontal plane and thereafter pressing the opposite ltaeral portions of these layers against a suitable form and so holding the layers while taking a set.

These and other more specific objects will appear upon reading the following specification and claims and upon considering in connection therewith the attached drawings to which they relate.

Referring now to the drawings in which a preferred embodiment of the invention is illustrated.

FIGS. 4 and 5 are diagrammatic views showing a typical arrangement of mesh reinforcing for a single flume section prior to being deformed against a mold member;

FIG. 6 is a cross-sectional view through a typical flume;

FIG. 7 is a cross-sectional view on an enlarged scale taken through a flume;

FIG. 8 is a longitudinal sectional view through a short length of a flume after installation with certain of the control plugs removed;

FIG. 9 is an end elevational view showing a preferred mode of supporting the flume sections; and FIG. 10 is a cross-sectional view through one of the outlet openings showing the plug in seated position.

Figure 1:
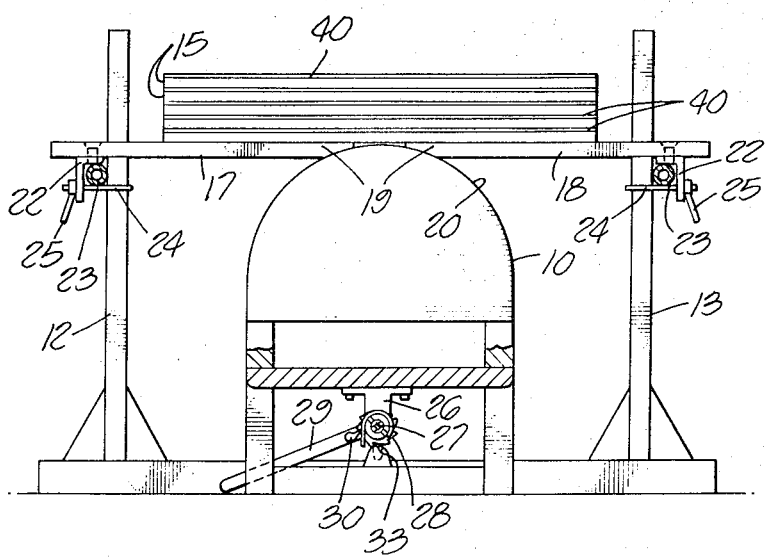
FIG. 1 is an end elevational view showing equipment suitable for fabricating the flumes and showing a plurality of prepared plaques taking a preliminary set.
Figure 2:
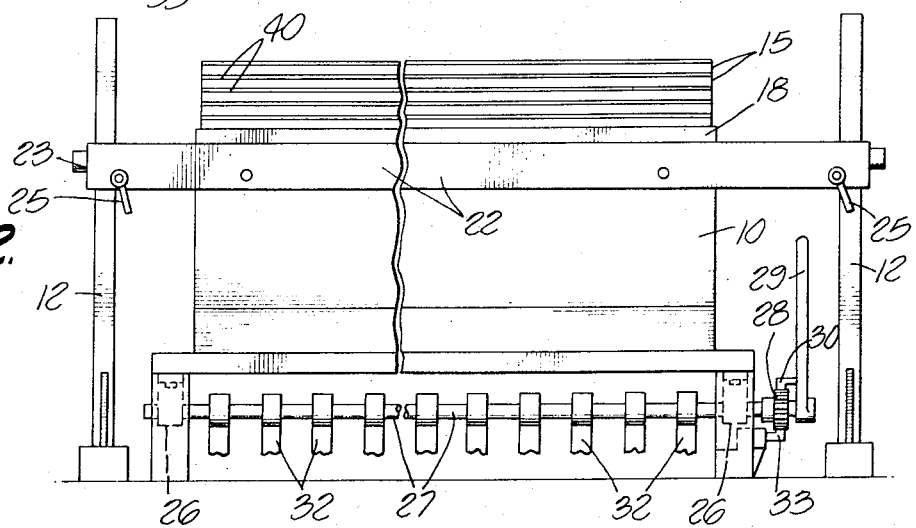
FIG. 2 is a side elevational view of FIG. 1.
Figure 3:
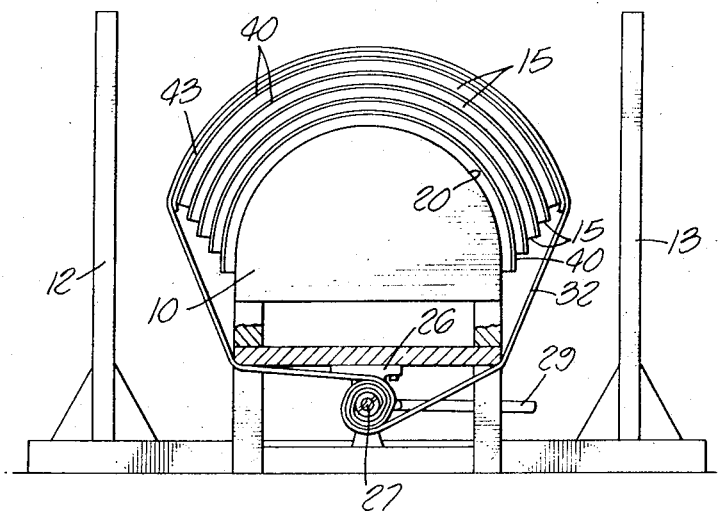
FIG. 3 is a view similar to FIG. 1 but showing a typical set of flume sections held against a male mold member.

Referring now more particularly to FIGS. 1 to 3, there is shown somewhat schematically suitable equipment for practicing the principles of this invention. Only the necessary equipment for forming a single set of flumes is illustrated but normally it will be understood that duplicate equipment is employed in order that workmen can proceed to form one set of flumes and then another throughout at least one full working day. The equipment includes an inverted semi-tubular male form 10 supported at a convenient working height between rigidly supported rows of uprights 12, 13. Although only two supports are shown along either side of the main mold member, any suitable number may be employed as necessary to support the number of flume plaques processed at the same time, as five to twenty.

Flume plaques 15, of which five are shown by way of illustration in FIGS. 1 to 3, are formed in sequence on rigid supporting platforms 17, 18. The inner edges 19 of these platforms are shaped to conform with the smooth rounded surface 20 of mold member 10 against which the platforms bear during the pouring and preliminary setting stages. Thus, the adjacent inner edges of platforms 17, 18 cooperate with surface 20 in providing a continuous support for the lower surfaces of the bottom one of plaques 15.

Each of the platforms 17, 18 is provided with suitable reinforcing means and with means for rigidly clamping the same to uprights 12, 13. By way of example, platforms 17, 18 are shown equipped with thick-walled angle irons 22 rigidly riveted or bolted to the underside of the platforms and spaced to rest on tubing 23 providing additional rigidity for the underside of the platform. This assembly is detachably clamped to uprights 12, 13 by J-bolts 24 having their threaded shanks extending through angle irons 22 and carrying handled clamping nuts 25.

Securely mounted on brackets 26 beneath the support structure for mold member 10 is a shaft 27 to the ends of which are fixed ratchet wheels 28. An operating lever 29 loosely journaled on shaft 27 carries a pivoting dog 30 and is operable during clockwise movement of the lever to tighten simultaneously a series of high-strength bands or straps 32 for a purpose which will be described more fully presently. Bands 32 comprise equal length loops having their opposite ends secured to shaft 27 at closely spaced points along its length. A locking dog 33 prevents reverse movement of the ratchet wheel and is preferably spring-biased normally into engagement with the teeth of the ratchet wheel.

The individual plaques 15 of reinforced cement are best shown in FIGS. 4 and 5, although it will be understood that the dimensions there depicted are out of proportion since the wall thickness is much thinner than that indicated in these figures. Typically, the thickness of the plaques and the finished flume is about $5/16$ to $9/16$ of an inch, it being understood that this value may vary with the length and width. A typical overall dimension is 8 to 12 feet long and 3 to 5 feet in diameter, although the width and length of the individual flumes may vary widely from these values.

Each plaque is reinforced, preferably by a plurality of strips of flexible metallic mesh such as wire cloth, expanded metal or the like. As shown in FIGS. 4 and 5, three strips 34, 35 and 36, shown in a preferred overlapping arrangement, with their edges terminating in echelon at either end of a flume section. In other words the strips are laid edge-to-edge to provide three layers of reinforcing substantially throughout the length of the individual sections, and terminating in echelon at the ends as is illustrated in FIGS. 4 and 5. Although not so illustrated in FIG. 4, it will be understood the reinforcing strips may and preferably do terminate in echelon along either lateral edge of the flume sections. For greater strength on the larger size flumes, one or more additional strips of reinforcing mesh may be laid lengthwise of the midportion of the flumes thereby increasing the strength of the flume bottom without materially altering the flexibility of the sidewalls. Usually the strips are laid directly upon one another prior to the application of ferro cement.

The ferro cement employed and found to provide excellent results in practice has the following illustrative composition:

Portland cement: 94 pounds
Fine sand: 66 pounds
Water: 35 pounds
Pozzolith: 3 ounces These ingredients are thoroughly intermixed, the amount of water being varied slightly from the value given above as necessary to provide a creamy mixture having substantially no tendency to flow when distributed in a thin layer of the dimensions noted above.

To construct a set of the invention flume sections, an adequate supply of the described ferro cement mix is prepared after forms 17, 18 have been arranged as illustrated in FIG. 1. The strips of reinforcing mesh are then placed as indicated in FIG. 4 on forms 17, 18 following which the cement mix is applied over the reinforcing and worked therethrough by suitable troweling or the like. Care is exercised to ascertain that all air pockets are eliminated, that the mix has passed through all areas of the reinforcing and that the latter is fully embedded within the mix. The ends and opposite lateral edges are accurately finished along straight lines parallel to one another. Thereafter, one and preferably two thin film-like layers of a separating material, such as plastic film 40, is placed in contact with the entire top surface of the first plaque 15. This film renders the contiguous plaques nonadherent to one another and assures a smooth surface. The separator film is readily removed from the plaques after the cement has taken a set, avoids any possibility of adjacent plaques adhering to one another and permits the lower surface of an overlying plaque to conform in size and shape with the adjacent surface of a lower plaque. Strips of reinforcing mesh for the succeeding plaque are then positioned above film 40 in the same manner as previously and cement mix is applied to the requisite thickness and distributed as described above for each plaque in its turn.

In the manner described a set of identical plaques 15, numbering from three or four to as many as twenty, are fabricated using separator film between each adjacent pair.

After completing the last one of a particular set of plaques, a flexible metal sheet 43 substantially coextensive in area with the plaques is placed against the top plaque and its overlying sheet of separator film. One end of the high-tension bands 32 is then placed across the top of the assembly and firmly anchored to shaft 27, care being exercised to determine that the stress in the bands is equalized before starting to operate ratchet lever 29. This problem can be minimized by using nylon webbing for the bands 32 because of its elastic characteristics which are found quite adequate to equalize the tension in the several bands. Ratchet lever 29 is operated to and fro about shaft 27 gradually folding the opposite lateral edges of plaques 15 downwardly against the opposite sides of the male mold form 10 and into their respective final cross-sectional configurations. The cross-sectional shape illustrated in FIG. 6 and representing a finished flume 45 is illustrative and found to exhibit excellent structural, handling strength and operating characteristics. The compressive forces applied by bands 32 are maintained for approximately 24 hours after which the locking ratchet dog 33 may be released and the ratchet reversely rotated to loosen the bands so that they can be removed along with metal sheet 43.

The internested flume sections 45 remain in place while taking a final set, a period of two to three days being found adequate for this purpose. Near the end of this period or prior to separation of the flume sections, it is convenient to cut one or more rows of closely spaced outlet openings 46, 47 lengthwise of the flume bottoms and preferably to either side of their longitudinal median plane. Holes of aproximately 1 to 1½ inch in diameter spaced not more than one foot apart enable the user to obtain wide range regulation of discharge at any point along the flume. These openings may be closed by plugs 48 of any suitable material having the general configuration shown in FIG. 9 and provided with a gasket ring 49. If desired these plugs may be formed on their upper sides with handgrips to facilitate their removal and replacement when adjusting, initiating or terminating flow.

In the formation and assembly of the flumes in the field, an internested set of the flumes may be transported to the place of assembly on the top portion of the form itself or they may be transferred to a special conveyance while still internested. Prior to the assembly of the flumeway, cradles 50 having the general configuration shown in FIG. 8 are erected in alignment with one another at appropriate spacings. As shown in FIGS. 7 and 8, the flume suspension cradles 50 comprise metal strips 51 conforming in shape with and having their opposite ends shaped as indicated in FIG. 9. These ends are punched with holes having a loose sliding fit over supporting metal stakes 52 driven deeply into the ground at either side of the flume ends. These stakes are conveniently selected from ribbed concrete reinforcing rods. The holes in strips 51 may be reinforced by washers 53 spot-welded to their lower ends. As will be readily apparent, the ribs along conventional concrete reinforcing steel provide a convenient means for supporting the suspension strips 51 at any of a large number of heights along stakes 52.

The placing of the flumes in cradles 50 is accompanied either by hand or by suitable handling equipment. Individual flume sections weight approximately 125 pounds and, accordingly, are easily handled by a man at either end while being inverted and overlapped in cradles 50. The flume sections of a given set differ slightly from one another in shape and size but this is of no consequence since consecutive flume sections are removed from a common stack in order and assembled to the last one removed. Furthermore, the flumes as a whole and side walls in particular are quite flexible and readily accommodate themselves to small range changes without risk of causing the ferro cement to craze or crack. Accordingly, the flumes readily flex to form a snug fit with one another and with seating surfaces 51 of supporting cradles 50. Preferably, mastic or ropes of calking material are inserted between the overlapped portions prior to assembly. This sealing material further compensates for imperfections in the adjacent surfaces of the flumes and, taken with the flexibility of the flume walls, assures water-tight joints.

Usually the irrigation channels extend crosswise of the flumeway proper, as is indicated at 60, 60 in FIG. 8, and have a width spanning two, three, or more of the outlet openings, 46, 47. Accordingly, it is a simple matter to regulate the flow by opening a smaller or larger number of the plugs 48 overlying a particular distribution channel 60. After a desired quantity of water has been released, the plugs are replaced individually or as a group at the need dictates.

While the particular flume and method of making same herein shown and disclosed in detail is fully capable of attaining the objects and providing the advantages hereinbefore stated, it is to be understood that it is merely illustrative of the presently preferred embodiments of the invention and that no limitations are intended to the detail of construction or design herein shown other than as defined in the appended claims.

I claim:

1. That method of making a series of internested flumes of reinforced cement shaped and sized for assembly in end-to-end slightly overlapping internesting arrangement to form an irrigation or the like flume which method comprises: supporting an elongated semi-tubular male mold member generally horizontally with the crown portion uppermost, positioning coplaner flat mold means horizontally and tangential to the crown of said male mold member, forming successive superimposed thin uncured layers of reinforced ferro-cement on said flat mold means separated from one another by thin flexible nonadherent sheet material, removing said flat mold means after the ferro-cement plaques have started to set, and applying pressure downwardly against said uncured layers to deform the same as a group into conformity with the exteriors of said male mold member while said ferro-cement continues to set.

2. That method defined in claim 1 characterized in the step of holding said layers forcibly against said male mold member while the same take a set.

3. That method defined in claim 1 characterized in wrapping band means about said layers and said male form and tensioning the same to deflect said superimposed layers against the opposite lateral sides of said male mold member.

4. That method defined in claim 1 characterized in the step of forming at least one row of holes extending lengthwise of said internested flumes closely adjacent the longitudinal center thereof.

5. That method defined in claim 1 characterized in using film-like plastic sheeting as the flexible sheet material separating adjacent layers of cement from one another.

6. That method defined in claim 1 characterized in forming each of said layers by placing a plurality of strips of metal mesh against one another on the top side of said thin flexible sheet material and generally coextensive with the width and length of each of said layers in succession, and applying a layer of ferro-cement over said mesh until the same is embedded and a layer of a desired thickness is obtained before proceeding to fabricate the next higher layer.

7. That method defined in claim 6 characterized in the step of distributing and smoothing the upper surface of said ferro cement to provide a completed layer of generally uniform thickness throughout.

8. That method defined in claim 1 characterized in the steps of forming said layers of ferro-cement in succession without reliance on flow restraining means for said ferro-cement along the perimeters of said layers but instead upon the substantially non-flowing consistency of said ferro-cement as prepared for use in fabricating said layers.

9. That method defined in claim 1 characterized in the step of forming at least one row of holes spaced to either side of the center portion of the bottom of said internested flumes.

10. That method defined in claim 4 characterized in that the forming of said row of holes is carried out while said ferro-cement is taking a set.

References Cited
UNITED STATES PATENTS

| | | | |
|---|---|---|---|
| 1,657,566 | 1/1928 | Crozier | 264—316 X |
| 2,511,421 | 6/1950 | Warner | 264—316 |
| 2,517,701 | 8/1950 | Oettinger | 264—339 X |
| 2,655,196 | 10/1953 | Magnani | 264—339 X |
| 2,683,915 | 7/1954 | Tounon | 264—339 X |
| 2,897,546 | 8/1959 | Clapp | 264—339 |
| 3,427,777 | 2/1969 | Crowley | 264—32 |
| 3,492,392 | 1/1970 | Kasamatsu | 264—316 X |
| 1,078,835 | 11/1913 | Craig | 61—14 |
| 3,041,660 | 7/1962 | Fink | 264—316 |
| 3,066,376 | 12/1962 | Pennell, Jr. | 264—316 |
| 3,446,025 | 5/1969 | Kock | 61—14 |
| 2,655,978 | 10/1953 | Gonda | 264—286 X |
| 3,489,387 | 1/1970 | Santos | 264—286 X |

ROBERT F. WHITE, Primary Examiner

R. R. KUCIA, Assistant Examiner

U.S. Cl. X.R.

264—297, 316, 339